United States Patent
Manfred et al.

(10) Patent No.: US 8,538,607 B2
(45) Date of Patent: *Sep. 17, 2013

(54) SYSTEMS AND METHODS FOR PROVIDING AIRCRAFT HEADING INFORMATION

(75) Inventors: Mark T. Manfred, Edina, MN (US); Thomas A. Ryno, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 596 days.

This patent is subject to a terminal disclaimer.

(21) Appl. No.: 12/695,502

(22) Filed: Jan. 28, 2010

(65) Prior Publication Data

US 2011/0184594 A1    Jul. 28, 2011

(51) Int. Cl.
*G06G 7/00* (2006.01)

(52) U.S. Cl.
USPC ............ 701/14; 701/3; 701/4; 701/7; 701/11; 701/36; 73/178 R; 33/352; 33/356

(58) Field of Classification Search
USPC ......... 701/3, 4, 7, 11, 36; 73/178 R; 33/352, 33/356
See application file for complete search history.

(56) References Cited

U.S. PATENT DOCUMENTS

| | | | |
|---|---|---|---|
| 5,001,646 A * | 3/1991 | Caldwell et al. | 701/7 |
| 5,379,223 A | 1/1995 | Asplund | |
| 5,515,282 A * | 5/1996 | Jackson | 701/4 |
| 5,841,537 A | 11/1998 | Doty | |
| 6,266,582 B1 | 7/2001 | Bruckner | |
| 6,433,736 B1 | 8/2002 | Timothy et al. | |
| 6,456,905 B2 | 9/2002 | Katz et al. | |
| 2004/0123474 A1 * | 7/2004 | Manfred et al. | 33/352 |
| 2005/0125120 A1 * | 6/2005 | Huynh et al. | 701/36 |
| 2005/0138825 A1 * | 6/2005 | Manfred | 33/356 |
| 2005/0150289 A1 * | 7/2005 | Osborne | 73/178 R |
| 2007/0010920 A1 * | 1/2007 | Lebrun et al. | 701/11 |
| 2007/0083301 A1 * | 4/2007 | Yeh | 701/3 |
| 2010/0152929 A1 * | 6/2010 | Manfred et al. | 701/4 |

* cited by examiner

*Primary Examiner* — James Trammell
*Assistant Examiner* — Sanjeev Malhotra
(74) *Attorney, Agent, or Firm* — Fogg & Powers LLC

(57) ABSTRACT

Systems and methods for providing aircraft heading information are provided. In one embodiment, an attitude heading reference device comprises: at least one interface for receiving heading information from one or more IRUs; at least one set of gyroscopes and accelerometers; a memory device for storing data representing heading information received via the at least one interface; and a heading calculator coupled to the at least one interface, the at least one set of gyroscopes and accelerometers, and the memory device. The heading calculator generating a heading output signal based on heading information when reliable heading information is received over the at least one interface; the heading calculator generating the heading output signal based on data from the memory device regarding previously reliable heading information and an output of the at least one set of gyroscopes and accelerometers when reliable heading information is not received over the at least one interface.

7 Claims, 3 Drawing Sheets

SYSTEMS AND METHODS FOR PROVIDING AIRCRAFT HEADING INFORMATION

BACKGROUND

One very important piece of information that aircraft pilots must be aware of is the heading of the aircraft they are flying. In the United States, regulatory agencies quantify this need by requiring that the probability of a pilot losing all heading information is less than $10^{-9}$ per hour. The primary means for obtaining heading information in an airliner or large business jet is typically an inertial reference system (IRS) utilizing gyrocompassing and the rotation of the Earth to determine what direction an aircraft is heading. It is typical that an aircraft's inertial reference system employ 2 or 3 inertial reference units (IRUs) to provide a degree of redundancy to satisfy the $10^{-9}$ per hour regulation. One problem associate with redundancy is that a bank of identical IRUs would be susceptible to a common mode failure. That is, a latent defect present in each of the identical IRUs may cause them to all fail under the same conditions at the same time. To mitigate occurrences of a common mode failure that eliminates all heading information, a pilot is typically provided with at least one dissimilar source of heading information. Traditionally, a magnetic compass has been utilized by pilots to satisfy the need for a dissimilar source of heading information. However, modern aircraft are increasingly being controlled via electrical/electronic systems and devices that produce fields that interfere with the ability of magnetic sensors to measure the Earth's magnetic field. That is, the increasingly prevalent use of electronics on aircraft make it increasingly difficult to find a place on the aircraft where a magnetic sensor can be installed without interference from magnetic fields generated by other aircraft systems.

For the reasons stated above and for other reasons stated below which will become apparent to those skilled in the art upon reading and understanding the specification, there is a need in the art for improved systems and methods for providing aircraft heading information.

SUMMARY

The Embodiments of the present invention provide methods and systems for providing aircraft heading information and will be understood by reading and studying the following specification.

Systems and methods for providing aircraft heading information are provided. In one embodiment, an attitude heading reference device comprises: at least one interface for receiving heading information from one or more IRUs; at least one set of gyroscopes and accelerometers; a memory device for storing data representing heading information received via the at least one interface; and a heading calculator coupled to the at least one interface, the at least one set of gyroscopes and accelerometers, and the memory device. The heading calculator generating a heading output signal based on heading information when reliable heading information is received over the at least one interface; the heading calculator generating the heading output signal based on data from the memory device regarding previously reliable heading information and an output of the at least one set of gyroscopes and accelerometers when reliable heading information is not received over the at least one interface.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the need for backup heading information by providing an alternate source, dissimilar to the aircraft's installed IRUs, that does not depend on magnetic compasses, magnetometers, or other magnetic sensors to provide accurate heading information.

Figure 1:
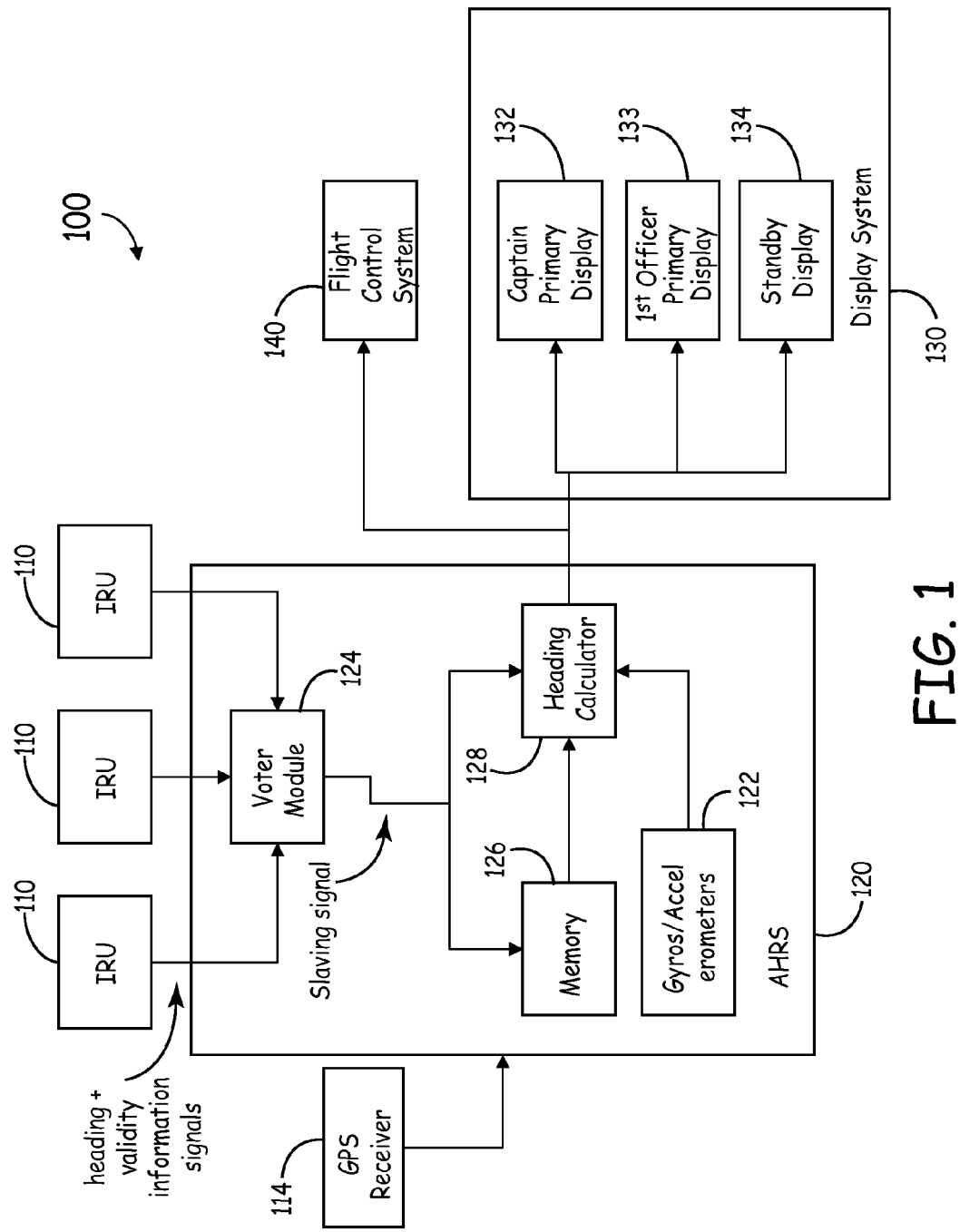
FIG. 1 is a block diagram illustrating an inertial system and display system of one embodiment of the present invention.

FIG. 1 is a block diagram illustrating an inertial system 100 of one embodiment of the present invention. Inertial system 100 comprises a plurality of inertial reference units (IRUs) 110, an attitude heading reference system (AHRS) 120, and a display system 130. Although three IRUs 110 are illustrated by the example of FIG. 1, embodiments of the present invention are not so limited. As used herein an IRU would include any inertial device having capabilities to determine heading through gyro-compassing. In alternate embodiments, a greater or fewer number of IRUs 100 may be present. AHRS 120 comprises at least one set of gyroscopes and accelerometers 122, a voter module 124, a memory device 126 and a heading calculator 128. Each of the IRUs 110 are coupled to the AHRS 120 and provide output signals to voting circuit 124 that include heading information. IRUs 110 are capable of providing both True Heading and Magnetic Heading signals. Gyro-compassing calculates True Heading and each IRU 110 converts the True Heading into a Magnetic Heading using what is referred to in the art as a "Mag Map." Embodiments of the present invention may be implemented using either True or Magnetic Heading signals from an IRU 110. Accordingly, as used herein, the terms "heading signal" and "heading information" refer equally to true heading or magnetic heading information derived from gyro-compassing measurements. In the embodiment of FIG. 1, the IRUs 110 also output validity information that provides an assessment of the degree to which the heading information is considered trustworthy (for example, based on built-in tests within each IRU 110 that indicate when an IRU 110 has failed). For example, in one embodiment an IRU 110 will output validity information indicating that the heading information signal it provides is trustworthy when the internal tests performed in the IRU 110 do not have any failures that would cause the heading signal to be inaccurate. When the internal tests within an IRU 110 detect such a failure, it will output the heading information along with validity information indicating that the heading information falls outside of the accuracy tolerance criteria, or it may simply stop transmitting any heading information.

When reliable heading information is being received from at least one of the IRUs 110, AHRS 120 operates in a "normal mode" where it generates a heading output signal that is derived from a slaving signal. The slaving signal is generated from heading information deemed reliable from the IRUs 110. As would be appreciated by one of ordinary skill in the art, the gyroscopes and accelerometers 122 are significantly less precise than those within the IRUs 110 and are not sufficient to perform gyro-compassing. Thus, the slaving signal derived from the output of the IRUs 110 provides AHRS 120 with a reliable heading from which it can measure deviations using the gyroscopes and accelerometers 122. The slaving signal also allows the AHRS 120 to estimate and remove bias errors in the AHRS gyroscopes 122. Heading calculator 128 can then generate heading information that is more accurate than it could be generated based on its gyroscopes and accelerometers 122 alone. In backup mode, when no reliable heading information is being received from IRUs 110, AHRS 120 enters a directional-gyro (DG) mode of operation. In DG mode, Heading calculator 128 utilizes the last reliable heading information it received from the IRUs 110 to convert measurements by gyroscopes and accelerometers 122 into backup heading information.

In operation, in one embodiment, voter module 124 performs the function of determining the makeup of the slaving signal that AHRS 120 uses in normal node and whether AHRS 120 operates in normal mode or DG mode. As shown in FIG. 1, the heading and validity information from each of the IRUs 110 is received at voter module 124. Voter module 124 evaluates this information to determine what, if any, reliable heading information is being received from the IRUs 110.

In one embodiment, as long as reliable heading information is available from at least one of the IRUs 110, voter module 124 produces a heading slaving signal using the reliable heading information. For example, when reliable heading information is available from two or more of the IRUs 110, voter module 124 averages the reliable heading information to produce the slaving signal. When reliable heading information is available from only one of the IRUs 110, then the slaving signal is produced from that single reliable heading information signal.

When voter module 124 determines that no reliable heading information is being provided by the IRUs 110, then the voter module 124 instructs AHRS 120 to shift into DG mode. In one embodiment, voter module 124 instructs AHRS 120 to shift into DG mode via the slaving signal. For example, in one embodiment, when voter module 124 determines that no reliable heading information is being provided by the IRUs 110, the slaving signal is turned off and AHRS 120 shifts to DG mode based on the loss of the slaving signal. In another embodiment, voter module 124 generates a specific signal or message to switch AHRS 120 to DG mode.

In one embodiment, voter module 124 utilizes the validity information signal produced by the IRUs 110 to make the determination as to whether heading information from each respective IRU 110 will be used to generate the slaving signal. In one alternate embodiment, either instead of or in addition to utilizing the validity information, voter module 124 independently determines reliability of heading information from the IRUs 110 based on the degree to which the heading information from each of the IRUs 110 agree. For example, in one embodiment, when the heading information from one of the IRUs 110 deviates beyond a predetermined threshold (as compared to the heading information from the other IRUs) then that heading information will not be used for generating the slaving signal. If the heading information from two remaining IRUs 110 begins to deviate beyond the threshold, then voting circuit will cause AHRS 120 to shift to DG mode.

In another alternate embodiment, instead of (or in addition to) having a voter module 124 vote the heading information signals from the IRUs 110, the AHRS 120 monitors for failures of the IRUs 110 by comparing heading information from the IRUs 110 against heading information measured by the AHRS 120 accelerometers and gyroscopes 122. If the Heading calculator 128 detects an inconsistency, such as a significant abrupt difference between the IRU 110 and AHRS 120 heading, the Heading calculator 128 could conclude that IRU 110 heading has failed, and switch to DG mode.

As shown in FIG. 1, in one embodiment, AHRS 120 includes a memory device 126 for storing reliable heading information received from the IRUs 110. In one embodiment, memory device 126 stores the last known reliable heading information as represented by the slaving signal. When AHRS 120 shifts into DG mode, the last known reliable heading information is retrieved by heading calculator 128 from memory device 126 for generating the backup heading information described above. Although FIG. 1 indicates voter module 124 and memory device 126 being integrated within AHRS 120, one of ordinary skill in the art upon reading this specification would appreciate that other embodiments include one or both of these devices implemented as discreet components within system 100.

In one embodiment, heading information generated by AHRS 120, whether in normal mode or DG mode, is provided to an aircraft's flight crew via display system 130. In one embodiment, display system 130 include a primary display device 132 for providing heading information to the Captain from one of the IRUs 110, a primary display device 133 for providing for providing heading information to the first officer from a different one of the IRUs 110, and a standby display device 134 for providing backup heading information to both the Captain and the first officer from the AHRS 120. In one embodiment, AHRS 120 indicates to the flight crew via display system 130 whether it is operating in normal or DG mode. Display system 130 in turn notifies the flight crew via display devices 132, 133 whether the heading information provided by AHRS 120 is normal mode heading information or backup mode heading information.

In addition to the $10^{-9}$ availability requirement established by regulation, their may also exists integrity requirements established by regulation. For example, a regulation may require that probability of a flight crew is given an incorrect heading solution is less than $10^{-7}$ per hour. As described in the previous section, the AHRS 120 will revert to DG mode for situations where reliable heading information is not available from the IRUs 110. However, the heading information provided while in DG mode will drift over time from the aircraft' actual heading because the gyroscopes and accelerometers 122 will likely be less precise than those within the IRUs 110 and thus the AHRS 120 heading information provided in DG mode is susceptible to drifting over time. For this reason, in one alternate embodiment, after a predetermined period of time in DG mode, Heading calculator 128 will switch to a track angle mode based on information provided by a Global Navigation Satellite System (GNSS) receiver such as Global Positioning System (GPS) receiver 114. As would be appreciated by one of ordinary skill in the art upon reading this specification, information from a GNSS receiver cannot be used to determine which direction an aircraft is pointing, but can be used to calculate the aircraft's track angle which indicates the direction the aircraft is moving. In the absence of wind, heading and tracking should be the same, but in the presence of wind currents, the aircrafts flight path will deviate from the direction it pointing.

Table 1, below, illustrates the AHRS 120 operating mode for example scenarios of one embodiment of the present invention.

from that single reliable heading information signal. In one embodiment, the method includes monitoring for failures of the IRUs by comparing any heading information from the IRUs against heading changes measured by AHRS accelerometers and gyroscopes. When the method at 310, in one embodiment, identifies a significant abrupt difference between the IRU and AHRS heading information, the method concludes that that IRU heading information is not available and switches the AHRS to DG mode.

TABLE 1

| SCENARIO # | IRU MAG HEADING STATUS | AHRS MAG HEADING SLAVING/DG MODE |
|---|---|---|
| 1 | At least two IRUs 110 have valid heading signals that compare within a reasonable threshold. | The AHRS 120 slaves its heading output to the average of the valid heading signals. |
| 2 | Heading signals from all IRUs 110 fail simultaneously (For example, this might happen due to a common-mode failure in the IRUs 110). | AHRS 120 reverts to DG Mode. |
| 3 | Heading signals from all but one IRU 110 fail. | AHRS 120 slaves its heading output to the heading signal from the remaining IRU 110. This provides heading availability for the scenario where the airplane is dispatched with only two operational IRUs 110 and one of the IRUs 110 fails in-flight. |
| 4 | Scenario #3, then the good IRU 110 stops transmitting or goes invalid. | AHRS 120 reverts to DG Mode. |
| 5 | At least two of the IRUs 110 have valid heading signals that compare within a reasonable threshold, then the two heading signals begin to miscompare even though the IRUs 110 report them as valid (i.e., a failure undetected by the IRUs 110). | AHRS 120 reverts to DG Mode. |

Figure 2:
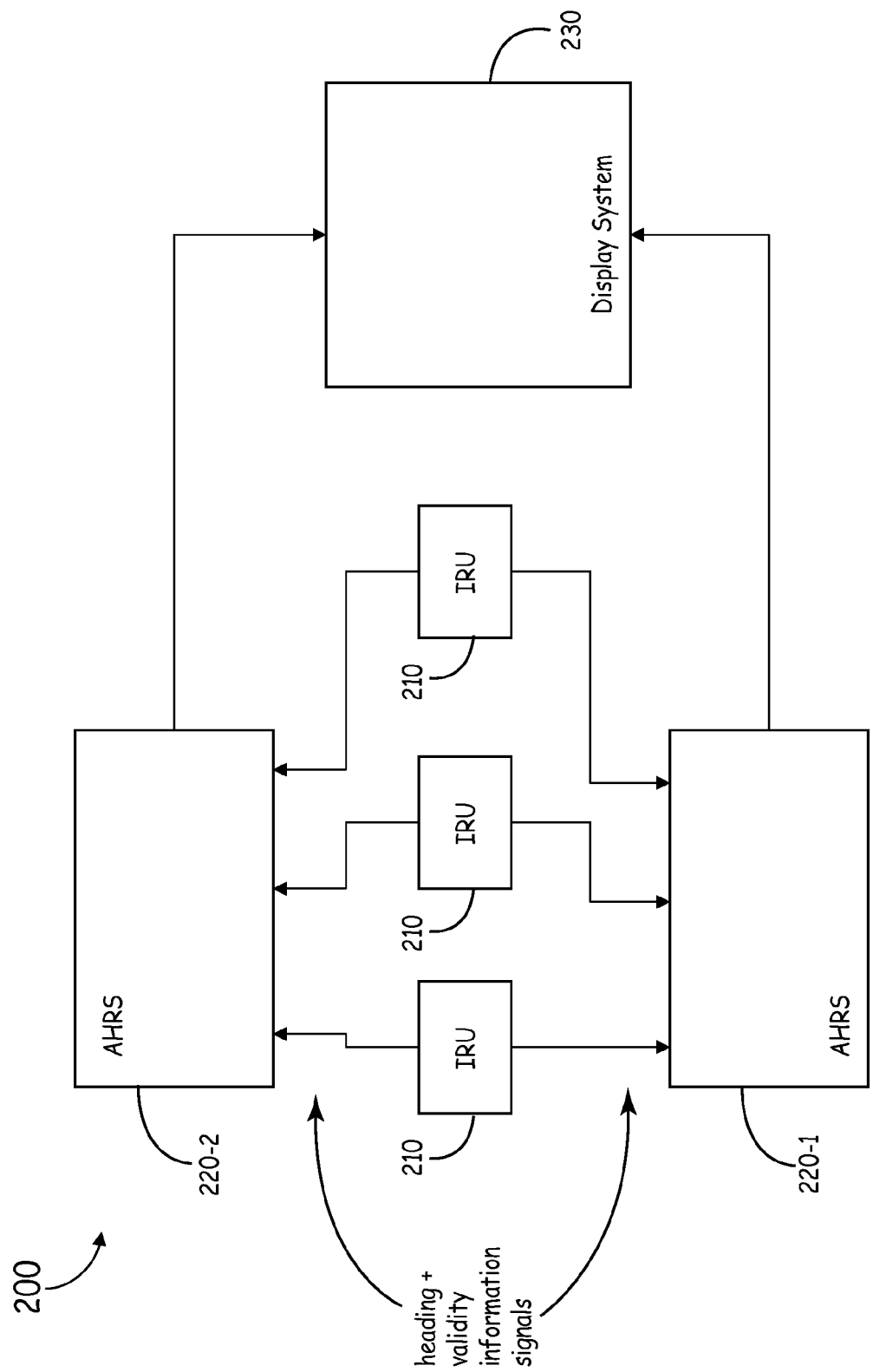
FIG. 2 is a block diagram illustrating an inertial system of one embodiment of the present invention.

As illustrated in FIG. 2, in one embodiment, an inertial system may comprise two AHRS units that function independently from each other. FIG. 2 illustrates an inertial system 200 comprising a plurality of inertial reference units (IRUs) 210, and a pair of attitude heading reference system (AHRS) 220-1 and 220-2, each coupled to a display system 230. For the particular embodiment illustrated, each of the AHRS 220-1 and 220-2 receives heading and validity information from all three of the IRUs 210 Each of the AHRS 220-1 and 220-2 independently provide heading information to display system 230, each operating in the same manner as described with respect to AHRS 120 in FIG. 1. For example, for the example scenarios described in Table 1, each of the AHRS 220-1 and 220-2 would switch between normal and backup (DG) mode in the same manner as indicated for AHRS 120.

Figure 3:
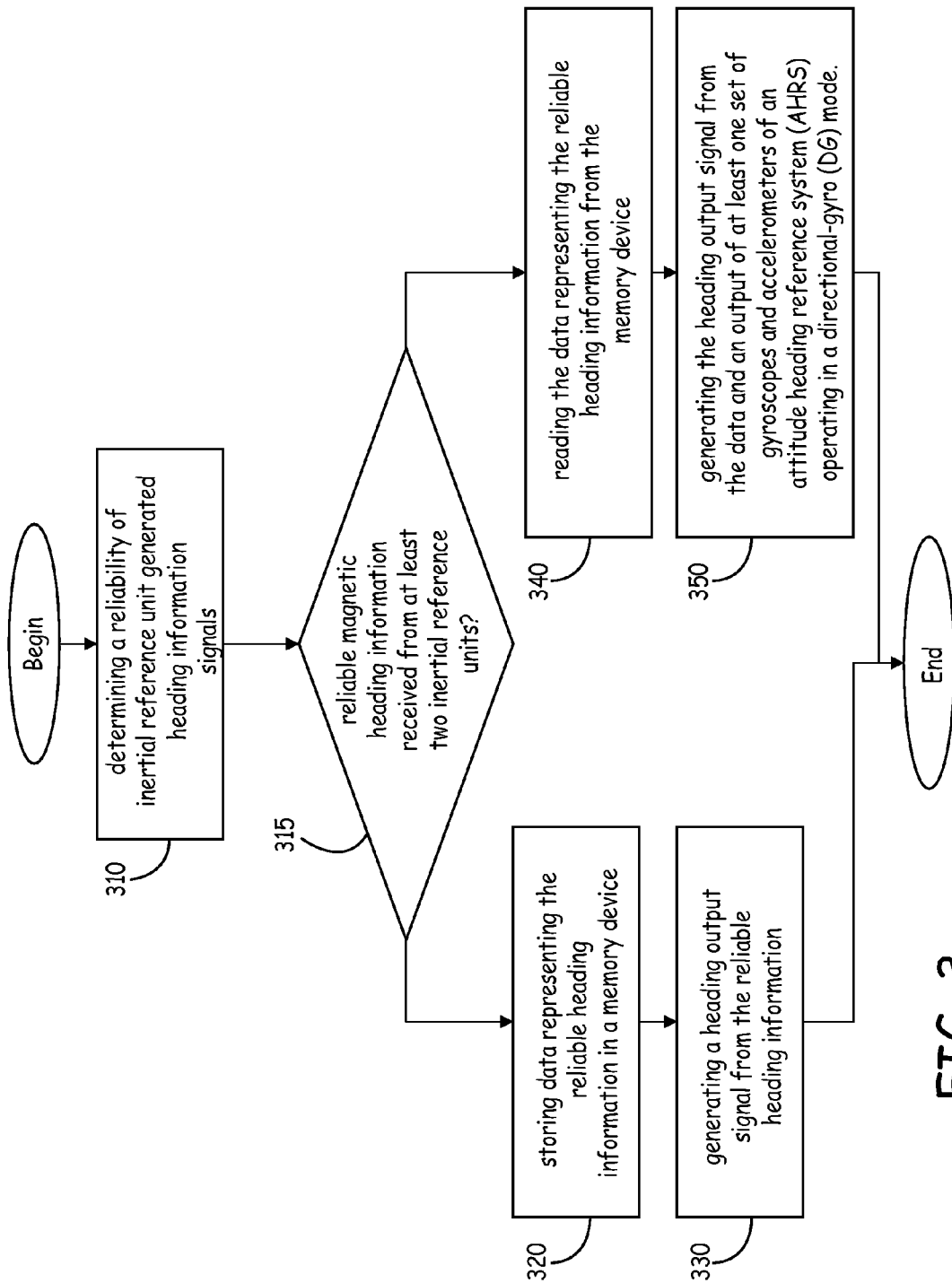
FIG. 3 is a flow chart illustrating a method of one embodiment of the present invention.

FIG. 3 is a flow chart illustrating a method of one embodiment of the present invention for providing standby heading information. The method begins at 310 with determining a reliability of inertial reference unit generated heading information signals. In one embodiment determining when reliable heading information is received from at least one inertial reference unit is based on validity information provided by the inertial reference units. In one embodiment, a voter module evaluates what, if any, reliable heading information is being received from the IRUs and produces a slaving signal. In one embodiment, as long as reliable heading information is available from at least one IRU, the voter module produces a slaving signal using the reliable heading information. For example, when reliable heading information is available from two or more IRUs, the method includes the voter module averaging the reliable heading information to produce the slaving signal. When reliable heading information is available from only one IRU, then the slaving signal is produced When reliable heading information is received from at least two inertial reference units (determined at 315), the method proceeds to 320 with storing data representing the reliable heading information in a memory device and to 330 with generating a heading output signal using the reliable heading information as a slaving signal. In one embodiment, as long as reliable heading information is available from at least one of the IRUs, a voter module produces a slaving signal using the reliable heading information. For example, when reliable heading information is available from two or more of the IRUs, the voter module averages the reliable heading information to produce the slaving signal. In one alternate embodiment, when reliable heading information is available from only one of the IRUs, then the slaving signal is produced from that single reliable heading information signal. The slaving signal derived from the output of the IRUs provides the AHRS with a reliable heading from which it can measure deviations using its own gyroscopes and accelerometers. The AHRS can then generate heading information that is more accurate than it could be generated based on its gyroscopes and accelerometers alone.

When reliable heading information is not received from at least two inertial reference units (determined at 315), the method proceeds to 340 with reading the data representing the reliable heading information from the memory device and to 350 with generating the heading output signal from that data along with the output provided by the AHRS's set of gyroscopes and accelerometers. When this occurs, the AHRS is switched to operate in a directional-gyro (DG) mode. In DG mode, the AHRS utilizes the last reliable heading information it received from the IRUs (which is stored in the memory device) to convert measurements by gyroscopes and accelerometers into backup heading information. The heading output signal may then be used for applications such as, but not limited to, displaying heading information to a flight crew and providing heading information to a flight control computer. In one embodiment, if reliable heading information is lost but later returns, the method will switch the back to normal operation from the DG mode operation.

Several means are available to implement the systems and methods of the current invention as discussed in this specification. These means include, but are not limited to, digital computer systems, microprocessors, general purpose computers, programmable controllers and field programmable gate arrays (FPGAs). For example, in one embodiment, computer system 120 is implemented by an FPGA or an ASIC, or an embedded processor. Therefore other embodiments of the present invention are program instructions resident on computer readable media which when implemented by such means enable them to implement embodiments of the present invention. Computer readable media include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An attitude heading reference device for an aircraft, the device comprising:
   at least one interface for receiving heading information from one or more inertial reference units (IRUs);
   at least one set of gyroscopes and accelerometers;
   a memory device for storing data representing heading information received via the at least one interface;
   a heading calculator coupled to the at least one interface, the at least one set of gyroscopes and accelerometers, and the memory device, the heading calculator generating a heading output signal based on heading information from the one or more IRUs when reliable heading information is received over the at least one interface, the heading calculator generating the heading output signal based on data from the memory device regarding previously reliable heading information and an output of the at least one set of gyroscopes and accelerometers when reliable heading information is not received over the at least one interface;
   a voter module for generating a slaving signal from the heading information received over the at least one interface, the heading calculator coupled to the voter module; and
   wherein when reliable heading information is received over the at least one interface, the heading calculator generates the heading output signal using the slaving signal.

2. The device of claim 1, wherein the heading calculator monitors for reliability of heading information received over the at least one interface by comparing heading information received over the at least one interface against heading information measured by the at least one set of accelerometers and gyroscopes.

3. The device of claim 1, wherein when the heading calculator detects an inconsistency between the heading information received over the at least one interface and heading information measured by the at least one set of accelerometers and gyroscopes, the heading calculator switches to a directional-gyro (DG) mode of operation where the heading calculator generates the heading output signal from an output of the at least one set of gyroscopes and accelerometers and information stored in the memory device regarding previously reliable heading information.

4. The device of claim 1, wherein the voter module utilizes validity information signals produced by at least one of the one or more IRUs to generate the slaving signal.

5. The device of claim 1, wherein the voter module determines a reliability of heading information provided from the one or more IRUs based on relative agreement of heading information between two IRUs.

6. The device of claim 1, wherein the plurality of IRUs each further provide validity information over the at least one interface that provides a reliability assessment of heading information.

7. The device of claim 1, wherein when reliable heading information is available from two or more of the one or more IRUs, the voter module averages the reliable heading information to produce the slaving signal.

* * * * *